UNITED STATES PATENT OFFICE.

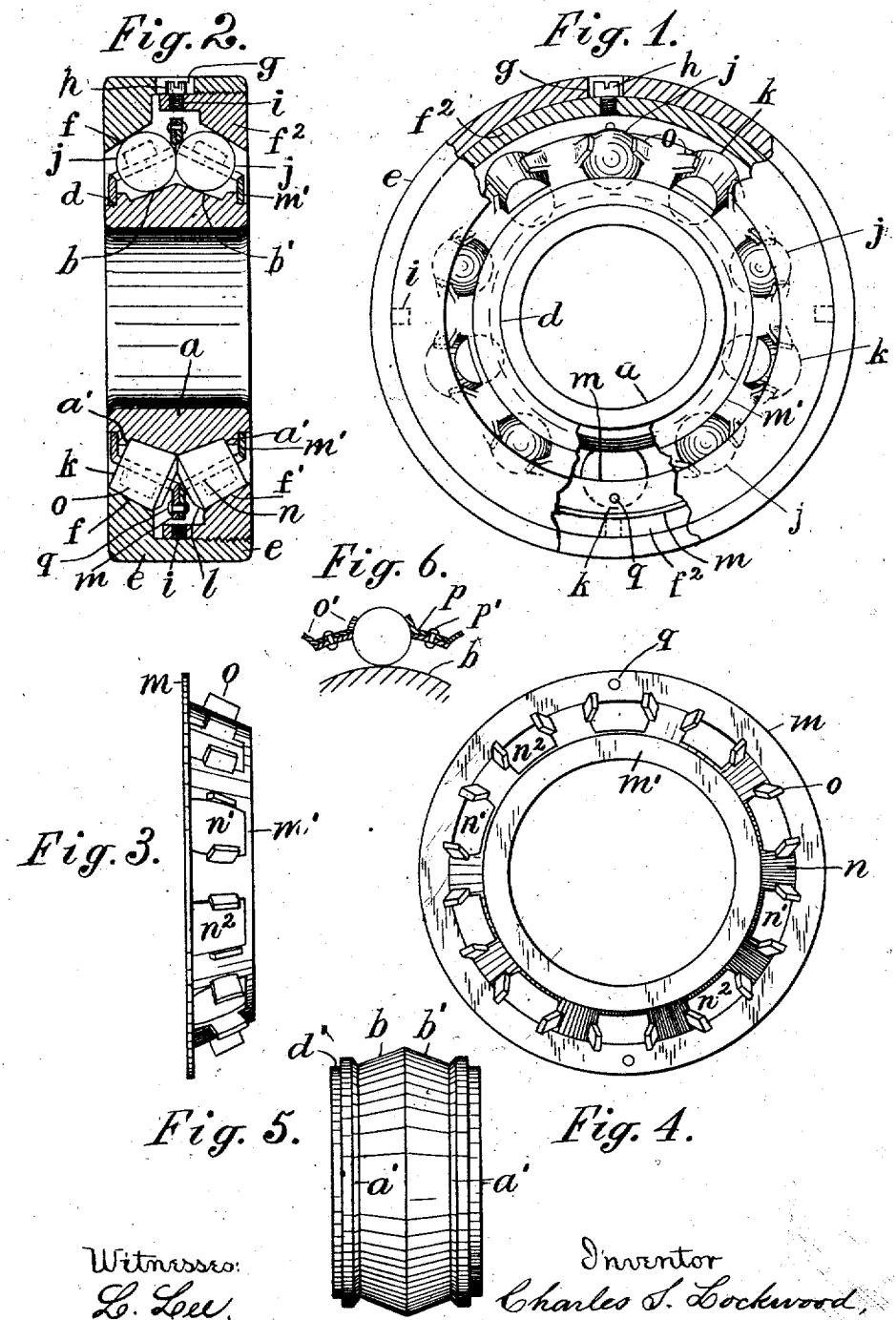

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

COMBINED ROLL AND BALL BEARING.

956,588.  Specification of Letters Patent.  Patented May 3, 1910.

Application filed November 1, 1909. Serial No. 525,609.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Combined Roll and Ball Bearings, fully described and represented in the following specification and the accompanying drawings, forming a part of the same.

The object of this invention is to secure in a single anti-friction bearing the different advantages which are obtained by using balls and rolls.

A ball-bearing operates with less frictional resistance than a bearing having rolls of the same size as the balls, for the reason that wear tends to remove some particles of the bearing which, with dirt from various sources is liable to accumulate upon the supporting surfaces by adhesion to the lubricating material. Such substances impede the movement of the balls or rolls in proportion to the area of the balls or rolls in contact with the supporting surfaces; and with balls and rolls of the same diameter the balls obviously have a much smaller area of contact.

On account of the increased area of contact, rolls are better adapted than balls to support a heavy load, and the hub upon which the balls run can also be furnished with a shoulder to engage the ends of the rolls so as to positively resist end-thrust, which is not the case with balls.

The advantages of the ball-bearing and of the roll-bearing are combined in the present invention, by forming a hub with doubly conical seats and proportioning the hub and casing so that rolls and balls of the same diameter may be fitted between the same, and preferably in alternation in a series about the axis of the bearing. The length of the rolls is in such case preferably made the same as the diameter of the roll at the middle of its length, so as to occupy the same space in the bearing as one of the balls. The balls and rolls are kept in their proper position within the casing by a suitable cage which is preferably made with means to retain them upon the hub when the casing is removed, so as to facilitate the assembling of the parts. The tapering seats within the casing which embrace the outsides of the balls and rolls must be separable to introduce the balls and rolls within the bearing, and the casing may, therefore, be made in two separate similar parts, or with a shell having one of the tapering seats fixed therein and the other removable and adjustable to facilitate the assembling and regulation of the parts.

The drawing illustrates one embodiment of the invention, Figure 1 being an end view of a bearing with part of the casing broken away to show the interior; Fig. 2 is a longitudinal section, where hatched, at the center line of the bearing; Fig. 3 is an edge view, and Fig. 4 an end view of one-half of the cage; Fig. 5 is an elevation of the hub, and Fig. 6 a cross section of part of the cage and hub with one of the rolls.

The hub $a$ is shown with conical seats $b$ and $b'$, and collars $d$ at the opposite end to guide the cage. The casing is formed with a cylindrical shell $e$ having a tapering seat $f$ opposed to the seat $b$ and a tapering seat $f'$ opposed to the seat $b'$. The seat $f'$ is formed upon a removable ring $f^2$ which is screwed into the cylindrical shell to permit its adjustment. The shell is formed with a slot $g$, and a screw $h$ is fitted through the slot into any one of a series of holes $i$ in the ring $f^2$ so as to secure it from turning when adjusted.

Fig. 1 shows the shell of the casing and the ring $f^2$ in section broken away, near the top, to the center of the slot $g$, thus fully exposing the rolls and balls which would otherwise be concealed by such part of the ring. At the bottom, the cage is broken to show the hub. On each end of the hub is shown a series of balls $j$ and rolls $k$ arranged alternately in the series, although such precise arrangement is not essential to the operation of the bearing. The balls and rolls in the two series are arranged in pairs so as to contact with one another, as shown in Fig. 2, where two balls are shown in the upper part of the bearing and two rolls in the lower part of the bearing. The contiguous ends $l$ of the rolls are beveled or coned so as to increase the bearing surfaces of their inner corners, and the corner at the outer ends of the rolls bears upon annular shoulders $a'$ formed upon the hub at the outer ends of the conical seats, which effectually prevent any end movement of the rolls. Owing to the double inclination of the seats $b$, $b'$ the outer parts of the rolls and balls are separated sufficiently to introduce flanges m which form the junction of two parts of a cage, each part having an outer flange m' to ride upon one of the hub-collars d. The flanges m, m', are connected by bars n which lie between the balls and rolls at their diametral line and thus hold them at a uniform distance in their movement around the hub. The spaces n' and n² within the cage for the balls and rolls are made of the same width and length so that the space within the casing which is occupied by the balls may be equally occupied by the rolls, and thus secure the greatest bearing surface for the rolls in such combination. To fit the same sloping seats as the balls, the rolls are obviously made, at the point where they fit upon such seats, of the same diameter as the balls and are also shown of the same length as such diameter.

One means of retaining the balls and rolls upon the hub when the casing is removed is shown in Figs. 1 to 4, consisting of the integral lugs o bent upward from the edges of the bars and inclined over the outer curved sides of the balls or rolls, as shown in Fig. 1. The same effect can be produced by securing upon each of the bars n a cross-piece p having lugs o' formed upon its opposite ends which can be bent over the rolls in the same manner as the lugs o, as in Fig. 6. The cross-pieces are shown in Fig. 6 secured upon the bars n by rivets p', but may be made with integral prongs to clench through holes in the said bars.

The two halves of the cage are like that shown in Fig. 3 and are connected together by rivets q through the flanges m, which can only be effected by first placing their flanges m' upon the opposite ends of the hub. The balls and rolls may be placed within the opposite halves of the cage before they are thus set upon the hub, and the rivets q then inserted, which, if the lugs o be already bent over the outsides of the rolling members serves to hold them upon the hub until the casing is applied. If preferred, the cage may be made of such metal that the lugs may be left separated sufficiently to insert the balls and rolls in position upon the hub after the cage is riveted thereon, and the lugs o or o' then bent to retain these rolling members in place.

In the operation of this bearing, the load is distributed upon the balls and rolls, and the inclination of the seats b, b', f and f', serves to crowd the seats together when the hub is pressed endwise, and thus support the end-thrust; the lateral thrust being sustained by the direct pressure of the seats toward one another. The balls obviously have no positive resistance to end-thrust, as the contraction between the seats b and f, or b' and f' tends to crowd the balls or rolls therein toward the opposite series of balls or rolls, the space inclosing such opposite series not being contracted by the same end-thrust, and thus permitting the shifting of the rolling members endwise. Such shifting which prevents a positive resistance to the end-thrust is avoided by the introduction of the rolls into the device, with their outer ends contiguous to the shoulders a', which wholly prevent end movement of the rolls and prevents the thrust upon the rolls in one series from pushing the rolls in the opposite series endwise. The rolls thus operate to perform a different function from the balls in resisting end-thrust, although the balls and rolls both sustain the side-thrust effectually, and the construction thus utilizes both the advantages of ball bearings and roller-bearings.

Having thus set forth the nature of the invention what is claimed herein is:

1. An anti-friction bearing having a hub with doubly conical seats and a casing with tapering seats opposed to the seats on the hub, and two series of balls and rolls adapted and arranged to roll between the seats upon the hub and casing, the balls of the two series and the rolls of the two series being arranged in pairs with the members of each pair in contact.

2. An anti-friction bearing having a hub with doubly conical seats and shoulders at the smaller ends of the seats, a casing with tapering seats opposed to the seats on the hub, and two series of alternate balls and rolls fitted respectively to the opposed seats with the ends of the rolls contiguous to the said shoulders.

3. An anti-friction bearing having a hub with doubly conical seats and shoulders at the smaller ends of the seats, a casing with tapering seats opposed to the seats on the hub, and two series of alternate balls and rolls fitted respectively to the opposed seats with the ends of the rolls contiguous to the said shoulders, the balls of the two series and the rolls of the two series being arranged in alternate pairs, with the members of each pair in contact.

4. An anti-friction bearing having a hub with doubly conical seats and a casing with tapering seats opposed to the seats on the hub, two series of balls and rolls fitted between the seats upon the hub and casing, the balls of the two series and the rolls of the two series being arranged in pairs with the members of each pair in contact, and a cage for guiding the two series of balls and rolls within the casing.

5. An anti-friction bearing having a hub with doubly conical seats and a casing with tapering seats opposed to the seats on the hub, two series of balls and rolls fitted between the seats upon the hub and casing, the balls of the two series and the rolls of the two series being arranged in alternate pairs with the members of each pair in contact, the rolls being beveled at their contiguous ends to increase their bearing surface, a cage for guiding the balls and rolls in their movement within the casing, and one of the tapering seats within the casing being secured removably and adjustably therein to facilitate the assembling and regulation of the parts.

6. An anti-friction bearing having a hub with doubly conical seats and a casing with tapering seats opposed to the seats on the hub, and two series of balls and rolls of the same diameter fitted between the seats upon the hub and casing, and a movable cage embracing the balls and rolls at their diametral line to guide them within the casing and having means for retaining the balls and rolls upon the hub when the casing is removed.

7. In a roller bearing, the combination, with a hub having doubly conical seats and a casing having tapering seats opposed to the same, of two series of rolling members fitted contiguous to one another between the opposed seats, the cage divided at the middle with flanges $m$ at their junction and flanges $m'$ at their outer ends adapted to ride upon the hub, the cage having apertures for receiving the rolling members with guide-bars between the apertures, and cross-pieces $p$ secured upon the guide-bars with lugs $o'$ at their ends bent to retain the rolling members upon the hub.

In testimony whereof I have hereunto set my hand in the presence of two subscribing witnesses.

CHARLES S. LOCKWOOD.

Witnesses:
 L. LEE,
 THOMAS S. CRANE.